United States Patent Office 3,371,270
Patented Feb. 27, 1968

3,371,270
DEVICES FOR THE MEASUREMENT OF WEAK MAGNETIC FIELDS BY NUCLEAR INDUCTION
André Rochet, Meylan, and Pierre Servoz-Gavin, Grenoble, France, assignors to The Commissariat à l'Energie Atomique, Paris, France
Filed Aug. 21, 1964, Ser. No. 391,141
Claims priority, application France, Sept. 4, 1963, 946,573
9 Claims. (Cl. 324—.5)

The present invention relates to improvements to devices for measuring weak magnetic fields by nuclear induction disclosed in the U.S. Patent No. 3,133,243 in the names of Georges Bonnet, Jean-Louis Laffon and Pierre Servoz-Gavin of May 12, 1964, and in the U.S. patent application, Ser. No. 328,796 now U.S. Patent No. 3,256,-477, filed by Daniel Gauthier, André Rochet and Pierre Servoz-Gavin on December 9, 1963, for "Methods and Devices for Measuring Weak Magnetic Fields, in Particular the Earth Magnetic Field, by Nuclear Induction," in particular to improvements in magnetometers which utilize a liquid sample comprising, on the one hand, a solvent with atomic nuclei having an angular momentum or spin and a magnetic moment both different from zero and on the other hand, dissolved in this solvent, a paramagnetic substance of hyperfine structure bringing into play the Overhauser-Abragam effect, when an electronic resonance line of this substance is saturated by an electromagnetic field.

The chief object of the present invention is to provide devices or magnetometers of this type which are better adapted to meet the requirements of practice, in particular concerning both the automaticity and facility of use of the apparatus and sensitiveness and accuracy in the measurement of magnetic fields.

In the above mentioned issued patent, there is described a method and a device for measuring weak magnetic fields (lower than approximately 10 gauss or oersteds) by means of a sample of matter containing atomic nuclei having a magnetic moment and an angular momentum both different from zero by nuclear induction, that is to say by applying an auxiliary magnetic field substantially perpendicular to the magnetic field to be measured for directing the magnetic moments of the atomic nuclei of the sample in the direction of the resultant magnetic field (sum of the field to be measured and of the auxiliary field), then suddenly cancelling this auxiliary field to enable the magnetic moments of said atomic nuclei to have a free precession movement about the magnetic field to be measured with a frequency, called Larmor frequency, strictly proportional to the intensity of this magnetic field, measurement of the frequency of the electromotive force produced (in a coil surrounding said sample and having its axis perpendicular to the field to be measured) by the rotating field (at the Larmor frequency) associated with this precession of the magnetic moment making it possible to deduce therefrom the intensity of the magnetic field to be measured (said coil also serving, as a rule, owing to a suitable switching device, to create, when it is fed with a unidirectional current, the auxiliary field). In said method and device there is dissolved in the sample a paramagnetic substance of hyperfine structure capable of producing the Overhauser-Abragm effect (for instance potassium nitrosodisulfonate) and subjected to a radio-electric field at electronic resonance frequency for saturating one of its electronic resonance lines having a hyperfine structure, whereby not only could the intensity of the auxiliary magnetic field be reduced to an order of magnitude little higher than the intensity of the magnetic field to be measured (for instance the intensity of the auxiliary field ranges from two to five times the intensity of the field to be measured), but also it was possible to apply the auxiliary field for an extremely short time, of the order of magnitude of the Larmor period (that is to say of the reciprocal of the Larmor frequency) which is 0.5 millisecond in the earth field for hydrogen nuclei (protons), in particular for a time a little or substantially higher than a quarter of this period, whereas the prior art called for a time of application of the auxiliary field of several seconds.

In the issued patent, the precession frequency was measured by means of a frequency-meter, or rather of a period-meter, which comprised means for producing a rectangular signal of a duration equal to a predetermined integral number of Larmor periods and a counter capable of counting the clock pulses (emitted at constant repetition frequency) during these signals, the number of these pulses being inversely proportional to the intensity of the magnetic field to be measured.

The issued patent was also concerned with an entirely electronic embodiment of the switching device connecting the coil placed around the sample alternately to a unidirectional current generator to permit of creating the auxiliary field and to the amplifier connected with the period-meter to permit of determining the free precession period, that is to say to an ultra quick switching device, which further increased the frequency of repetition of the measurements.

As for the subsequent patent application, the subject matter thereof consisted:

On the one hand, concerning the method, in systematically beginning to apply the auxiliary magnetic field for every measurement operation after the determination of the period of the precession signal of the preceding measurement operation, when the magnetic moments, of the atomic nuclei of the sample, having a magnetic moment and an angular momentum different from zero, occupy, before being once more in line with the magnetic field to be measured, a well determined and constant position on the precession cone, that is to say for a given phase angle of the electromotive force induced by the precession of this magnetic moment, this position and this angle corresponding substantially to the maximum amplitude of said precession signal, On the other hand, concerning the device, in including therein means for deducing from the rectangular signal, of a duration equal to a predetermined integral number of Larmor periods, produced in the period-meter or frequency-meter, a pulse synchronous with the beginning or, preferably, the end of this signal, means for delaying this pulse by a constant but adjustable amount (possibly shorter than the Larmor period), and means for causing the delayed pulse to start the unidirectional current which creates the auxiliary magnetic field in the coil surrounding the sample.

The present invention has for its object to improve such magnetometers and its main feature consists in effecting the switching and the feed of unidirectional current to the coil surrounding the sample by means of two monostable multivibrators;

The first of which controls, when it is triggered at the beginning of every measurement cycle, the switching of a main relay from its position of rest, in which it connects said coil with an adjustable condenser which is connected in series to form a first oscillatory circuit oscillating at the Larmor frequency, and with an amplifier device, which supplies current to said period-meter, to its working position, wherein it connects said coil with a damping resistor the value of which ensures the critical damping of the oscillations that can be produced in a second oscillatory circuit, constituted by the inductance of said coil and the parasitic capacities of said coil and of the connecting cable, and, The second of which, triggered after the first one, on every measurement cycle, controls, when it is triggered, the connection of said coil with a unidirectional current source, The times for which each of the two monostable multivibrators remains in its unstable or energized state being adjusted in such manner that the second monostable multivibrator returns to its stable initial state, preferably after a time of the order of magnitude of the Larmor period or of a fraction of this period, before the first monostable multivibrator returns to its initial stable state.

Preferably, we may provide an auxiliary relay brought into play by the action on the first monostable multivibrator and which returns to its position of rest with a short delay with respect to the return of the main relay to the position of rest, this auxiliary relay opening, when it is in the active state, an oscillatory or tuned circuit having its pass-band centered on the Larmor frequency, provided in the amplifier system, which reduces the gain of the latter in the vicinity of this frequency.

As for the triggering of the two monostable multivibrators, it may be obtained, for instance:

Either by an astable multivibrator having an asymmetrical cycle, which triggers the first monostable multivibrator on every switching of said astable multivibrator from its first astable state to its second astable state and which triggers the second monostable multivibrator on every switching of said astable multivibrator from its second astable to its first astable state.

Or through means for resetting nuclear magnetic moments into phase as provided in the above mentioned prior patent application, that is to say through means for producing a delayed pulse.

The invention comprises, apart from this main feature, some other features which are preferably, but not necessarily, used at the same time, as it will be hereinafter stated, in particular:

A second feature, according to which, in order to measure the duration of the Larmor period of nuclear precession, we provide, in combination, a shaping unit, connected to the output of the amplifier system, to deduce, from the Larmor frequency oscillations produced in said first oscillatory circuit by the voltage collected by said coil and amplified in said amplifying system, rectangular signals of the same period, a divider capable of dividing thte frequency of said rectangular signals by any given integer, preferably adjustable, in such manner as to obtain several ranges of precision (the precision and the duration of the measurement cycle increasing with the value of said integer), a gate device disposed between the shaping unit and the divider so as to permit the feed of the divider by the shaping unit only when said gate device is fed with current, a first bistable circuit capable of feeding current to said gate device after it has received, on its first input, a starting signal delayed with respect to the time of connection of said coil with the amplifying device, a second bistable circuit both of the inlets of which are connected with the output of the divider and the output of which, fed with current at the time of the switching of this bistable circuit results from the second output pulse of the divider produced after the beginning of a cycle, acts upon the second input of the first bistable circuit in such manner as to stop the feed of current to said gate device, an oscillator working at a very stable and well determined frequency, for instance one megacycle per second, a counting scale adapted to count the oscillations of said high frequency oscillator during the duration of the voltage step emitted by the second bistable circuit on said output, and resetting means for returning to zero, at the end of every measurement cycle, the divider, and possibly the bistable circuits, A third feature, which consists in providing a device for printing, in numerical form, the results of the measurements, this device comprising, in combination with said counting scale, a display monostable multivibrator which displays the number of high frequency oscillations counted by said scale at the end of said number of Larmor periods, a printing monostable multivibrator which is triggered at the end of the display produced by said first mentioned monostable multivibrator and which actuates, preferably through an amplifier, a numerical printing device, a cancelling monostable multivibrator which causes the display to be cancelled a given time (for instance averaging the second) after the end of the display, that is to say after the printing has taken place, and means for resetting to zero the printing means in case of bad operation thereof, A fourth feature, which consists in providing an analog recording device for recording the results of measurement comprising, in combination with said counting scale storing decades preferably constituted by bistable circuits including a tunnel diode and a resistor, capable of supplying an analog current proportional to the number that has been stored therein, a reading monostable multivibrator which is operated at the end of said number of Larmor periods and which controls the transfer to said storing decades of the contents of corresponding decades of the counting scale, this monostable multivibrator further controlling, in the case of the measurement results being not printed, through suitable means, the resetting to zero of the counting scale, and a galvanometric recorder fed, preferably through an amplifier, with the analog current delivered by said storing decades.

A preferred embodiment of the present invention will be hereinafter described with reference to the appended drawings, given merely by way of example, and in which:

FIGS. 1 and 2 show, in the form of blocks, the whole of a nuclear induction magnetometer according to the invention, FIG. 1 corresponding to the portion of the magnetometer up to the counting scale C, whereas FIG. 2 shows the display, printing and recording devices controlled from said scale;

FIGS. 4 and 5 show the shape of signals brought into play in the magnetometer of FIGS. 1 and 2, FIG. 4 illustrating the shape of the signals used in the portion of the magnetometer illustrated by FIG. 1, whereas FIG. 5 shows the shape of the signals used in the portion of the magnetometer illustrated by FIG. 2;

Figure 1:
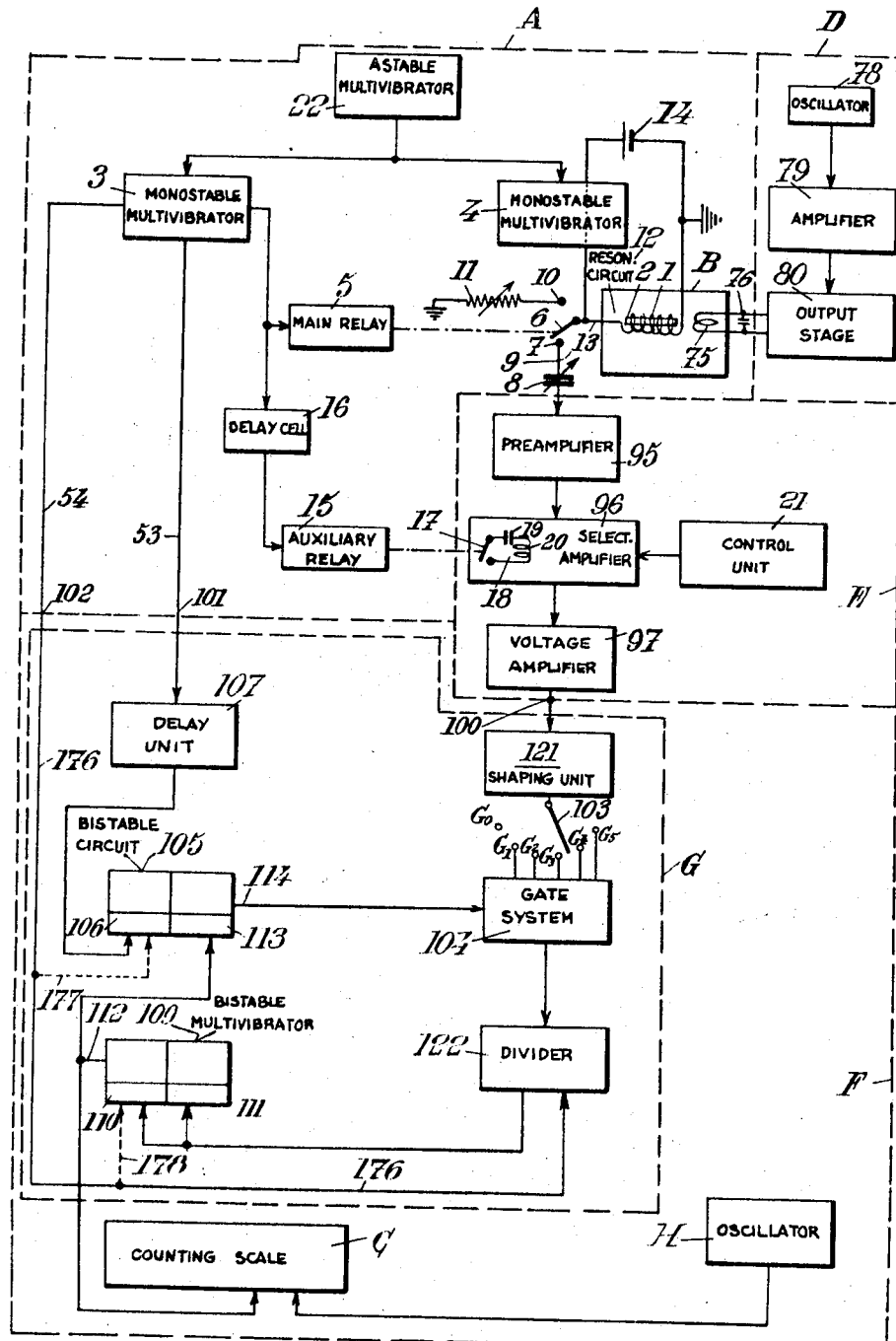
Figure 3:
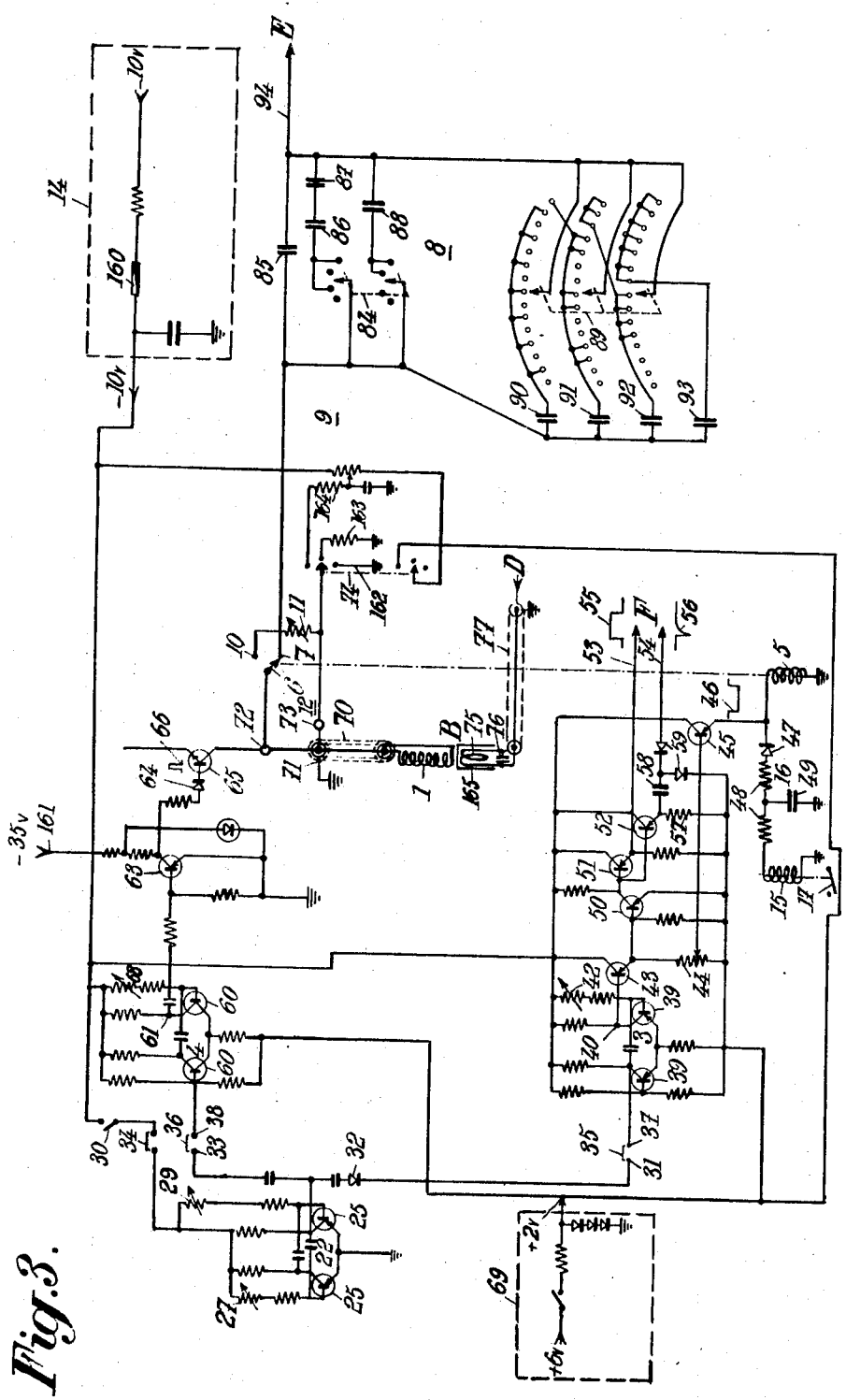
FIG. 3 illustrates in detailed fashion the portion A of FIG. 1 surrounded by dotted lines, that is to say the switching device proper with the measurement head B containing the sample which includes the atomic nuclei having a magnetic moment and an angular momentum both different from zero and the paramagnetic substance having a hyperfine structure.

Referring, on the one hand, to FIG. 1, and, on the other hand, to FIG. 3, we will first describe the main feature of the invention.

According to this feature, the switching and the feed of unidirectional current to coil 1 serving to create the auxiliary field and to collect the nuclear signal in measurement head B—which coil surrounds a vessel 2 containing the sample of matter, consisting of atomic nuclei having a magnetic moment and an angular momentum different from zero and of a paramagnetic substance of hyperfine structure (capable of bringing into play the Overhauser-Abragam effect) one electronic resonance line of which is saturated by a device D, said vessel containing for instance an aqueous solution of potassium nitrosodisulfonate—are performed by means of two monostable multivibrators 3 and 4.

The first monostable multivibrator 3 controls, when it is triggered at the beginning of every measurement cycle (which may last either for some seconds, in the case where the results are printed, or for a fraction of a second when use is made of the improvements according to the above mentioned patent application and the results are not printed), the switching of a main relay 5 from its position of rest, wherein its movable plate 6 rests upon the fixed contact of rest 7 to connect coil 1 with an adjustable capacitor 8 which is connected in series to form a first oscillatory or resonating circuit 9 at the Larmor frequency, and with an amplifier device E, which feeds current to period-meter or frequency-meter F, to its working position, wherein movable plate 6 is applied against the working fixed contact 10 to connect coil 1 with an adjustable damping resistor 11, the adjustable value of which ensures the critical damping of the Larmor frequency oscillations (about 2000 cycles per seconds, in the case of a sample containing protons as atomic nuclei and when the magnetometer is placed in the earth magnetic field) in a second oscillatory circuit 12 constituted by the inductance of coil 1 and the parasitic capacities of this coil and of connecting cable 13.

The second monostable multivibrator 4, which is triggered after the first one (monostable multivibrator 3) on every measurement cycle, controls, when it is triggered, the connection of coil 1 with a unidirectional current source 14.

The time for which each of said monostable multivibrators 3 and 4 remains in its unstable or energized state is adjusted in such manner that the second multivibrator 4 returns to its stable initial state preferably after a time of the order of the Larmor period or of a fraction of this period (for instance after 0.125 millisecond in the case of the precession of protons in the earth magnetic field, that is to say when the Larmor period is substantially equal to 0.5 millisecond), before the first multivibrator 3 returns to its stable initial state.

Preferably, we make use, in combination with the above mentioned arrangement, of an auxiliary relay 15 brought into operation by the triggering of the first monostable multivibrator 3 and which returns to its position of rest with a slight delay (averaging some Larmor periods), produced by a retardation or delay cell 16, with respect to the return of main relay 5 to its position of rest, this auxiliary relay 15 opening, through its movable plate 17, when it is in working position, an oscillatory or tuned circuit 18, including a capacitor 19 and a coil 20 (the inductance of which can be modified by a control unit 21) having a pass-band centered on the Larmor frequency (2000 cycles per second) in the particular case that is considered, provided in the amplifier E, which reduces the gain thereof in the vicinity of this frequency).

As for the triggering of the two monostable multivibrators 3 and 4, it may be performed for instance:

Either, as illustrated (in FIGS. 1 and 3), by an astable multivibrator 22 having an asymmetrical cycle, which triggers the first monostable multivibrator 3 upon every switching from the first astable state to the second astable state of said multivibrator 22 and which triggers the second monostable multivibrator 4 upon every switching from the second astable state to the first astable state of said multivibrator 22;

Or through means for resetting into phase the nuclear magnetic moments contained in vessel 2, such means being of the type of those disclosed in the above mentioned patent application.

In the embodiment of the invention illustrated by FIGS. 1 and 3, the portion of the magnetometer above referred to may be made as follows, when the control of the two monostable multivibrators 3 and 4 is effected by means of a multivibrator 22.

Figure 4:
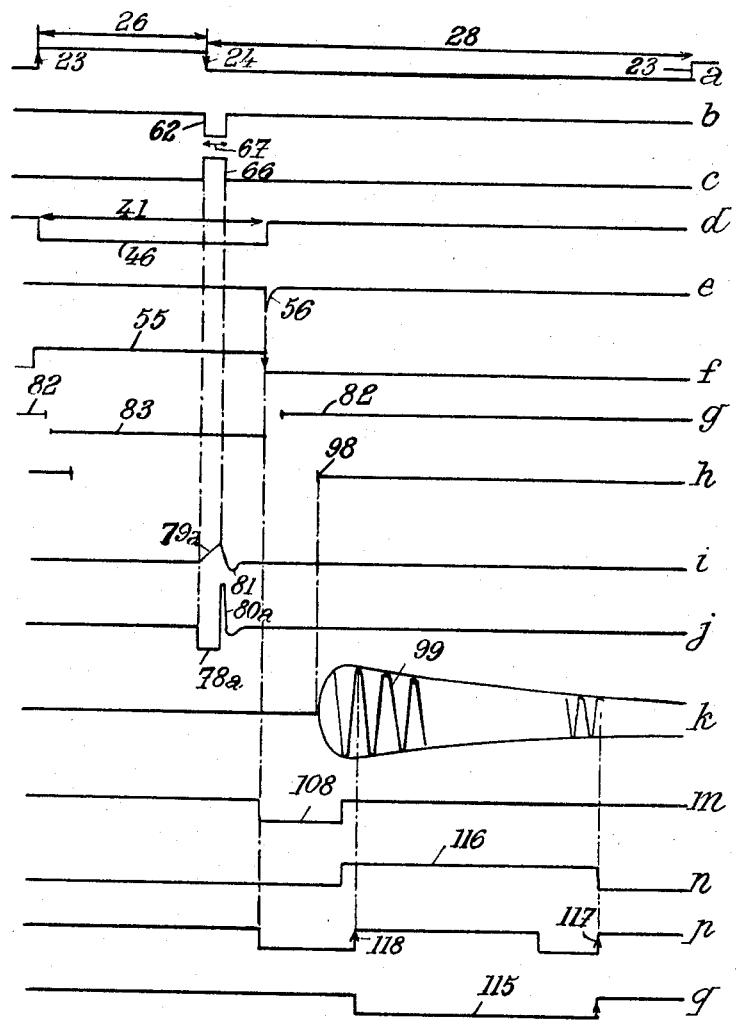

Multivibrator 22, which determines the frequency of repetition of the measurement cycles, has an asymmetrical cycle, as shown by the wave-form a of FIG. 4. It triggers, at its upward end 23 (when shifting from its first astable state to its second astable state), the first monostable multivibrator 3, whereas it triggers, at its downward vertical end 24 (when shifting from its second state to its first state), the second monostable multivibrator 4.

In FIG. 3 the astable multivibrator 22 consists of two transistors 25 of the PNP type, the time 26 for which said multivibrator remains in its first astable state being adjusted, by means of a first potentiometer 27, to a value ranging from 10 to 50 milliseconds, whereas the time 28 for which said multivibrator remains in its second astable state may be adjusted, by means of a second potentiometer 29, to a value ranging from 150 to 7000 milliseconds. Multivibrator 22 is fed from a stabilized voltage source 14 (for instance of −10 volts) when control switch 30 is closed and it then feeds current through a first output 31 to supply the first monostable multivibrator 3 with positive steps of span 26 passing through a semi-conductor diode 32 and through a second output 33 to supply the second monostable multivibrator 4 with negative steps of span 28.

The three connectors 34, 35 and 36 serve to connect the astable multivibrator 22 respectively with supply source 14, monostable multivibrator 3 and monostable multivibrator 4. When these connectors are removed, multivibrator 22 is out of the circuit, and access is directly had to the inputs 37 and 38 of the first and second monostable multivibrators 3 and 4 respectively, which permits of controlling them according to the indication given in the above mentioned patent application, that is to say from the monostable multivibrator for resetting into phase the magnetic moments as described in said patent application.

It will be remembered that the device for resetting the spins into phase according to said patent application is essentially constituted by a monostable multivibrator supplying a voltage step of a duration which can be adjusted with precision.

In case of adaptation to the device according to the present invention, this duration must be adjusted to be at least equal to the time of shifting of the movable plate 6 from contact 7 to contact 10. This duration will be adjusted so that the unidirectional current pulse is sent at a well determined time of the Larmor period. For this purpose, the monostable multivibrator serving to the resetting into phase is triggered by step 115 (FIG. 5), the function of which in counting will be hereinafter explained with reference to FIGS. 2 and 5. As this step 115 is negative, the phase resetting monostable multivibrator is triggered by the voltage increase that takes place at the end of the step to supply a negative signal the polarity of which is reversed in a reversing device, said reversing device therefore delivering a positive voltage step which corresponds to the portion 26 of the signal a of FIG. 4. The phase resetting device has a double output, with a diode in each output, the two diodes being mounted in opposed arrangement to each other so as to connect the double output, on the one hand, with the input 37 of monostable multivibrator 3 in order to supply it with positive output pulses, and, on the other hand, with the input 38 of monostable multivibrator 4 in order to supply it with negative output pulses.

The first monostable multivibrator 3 is also made of two PNP transistors 39. It is switched from its stable first state to its unstable second state when the front portion 23 of the wave a received from multivibrator 22 (or from the monostable multivibrator resetting the magnetic moments into phase, after reversal) passes on its input 37, emitting at its output 40 a voltage step of a duration 41, adjustable by means of a potentiometer 42 to values ranging from 5 to 50 milliseconds. This voltage step is applied to the input or base of a PNP transistor 43 mounted as an emitter-follower. The latter first attacks, through a rheostat 44 which permits of adjusting the level of the step and a PNP transistor 45 also mounted as an emitter-follower, a relay coil 5 actuating movable plate 6. The voltage step, which triggers the coil of relay 5, is shown at 46 in FIGS. 3 and 4 (wave d). This negative step 46 also triggers—through a delay cell 16, advantageously constituted by a T filter including a diode 47, a resistor 48 and a capacitor 49, diode 47 serving to introduce different time constants for the loading and unloading of capacitor 49 (it is thus possible to obtain for loading a time constant of 0.3 millisecond and for unloading a time constant of 2.4 milliseconds, and thus a small delay, of about from 0.5 to 1 millisecond, on the opening of relay 15, with respect to the opening of relay 5 and a much more important delay, averaging 10 milliseconds, with respect to the closing of relay 15 on relay 5, account being taken of the release threshold of relay 15)—a second relay coil 15, to wit that of the auxiliary relay, capable of actuating the movable plate 17 of tuned circuit 18 (FIG. 1). Furthermore, the output signal of transistor 43 connected as an emitter-follower, is amplified by a PNP transistor 50, connected as a common emitter, then triggers respectively one of the transistors 51 and 52, connected as emitter-followers, before being available, at one of the outputs 53 and 54 respectively, as a positive voltage step 55 and a negative voltage pulse 56 (the latter being obtained by differentiation, in a differentiating circuit including a resistor 57 and a capacitor 58, of a voltage step analogous to step 55 and consisting of only the negative peaks owing to the system of diodes 59), the function of signals 55 and 56 being stated hereinafter when describing the operation of frequency-meter or period-meter F.

As for monostable multivibrator 4, which comprises, like monostable multivibrator 3, of two PNP transistors 60, it receives on its input 38 the output of multivibrator 22 or that of the monostable multivibrator for resetting into phase described in the above mentioned patent application, treated as above explained. In the first case, it is triggered by the rear edge 24 of wave a to switch from its stable state of rest to its unstable state, transmitting through its output 61 a negative voltage step 62 (wave b of FIG. 4) which is amplified and given the opposed polarity in amplifying transistor 63 (fed from a voltage source of, for instance, −35 volts), the amplified step 66 of positive polarity (wave c of FIG. 4) being fed through a diode 64 to the base of a NPN transistor 65 normally blocked and acting as an electronic switch. Transistor 65 therefore receives positive step 66 as a release pulse. The duration 67 of steps 62 and 66 is adjustable from 0.050 to 0.500 milliseconds, for instance at 0.125 millisecond, by means of a potentiometer 68.

The arrangement of FIG. 3 comprises, for feeding the respective transistors, in addition to the main feed at −10 volts of source 14, a feed 69 at +2 volts for monostable multivibrators 3 and 4 and a feed 161 at −35 volts.

Voltage steps 46 and 66, transmitted from monostable multivibrators 3 and 4 respectively, serve to control the switching of the low frequency (Larmor frequency) coil comprised in measurement head B. This head essentially comprises a vessel 2 which may be for instance of the type described in the French Patent No. 1,358,352 filed July 18, 1960, and delivered March 9, 1964, to which corresponds U.S. Patent No. 3,166,707 issued January 19, 1965, containing, for instance, 200 cm.³ of an aqueous solution of 1 g. of potassium nitrosodisulfonate in 1 litre of water. This vessel is surrounded by the low frequency coil 1, which may consist for instance of 4,800 turns of fine wire and have an inductance ranging from 1 to 1.1 henry. The two ends of coil 1 are connected together through a triaxial cable 70 the external conductor of which is grounded at 71, the internal conductor of which is connected, on the one hand, to the first end of coil 1 and, on the other hand, to a terminal 72 connected both to the collector of the circuit breaker transistor 65 and to the movable plate 6 of relay 5 and the intermediate conductor of which is connected, on the one hand, to the second end of coil 1 and, on the other hand, to a grounding terminal 73 through a double switch 74 adapted to select several resistors 162, 163, 164.

The contents of vessel 2 are also subjected to the influence of a low frequency coil 75 comprising several turns of a diameter greater than that of the turns of coil 1, a screen 165 electrostatically uncoupling coils 1 and 75. Coil 75 forms, together with a capacitor 76, a high frequency resonating circuit tuned to the electronic resonance frequency of the nitrosodisulfonate (averaging from 55 to 56 megacycles per second). Resonating circuit 75–76 is fed with current, through a coaxial cable 77, from a system D constituting a high frequency generator which supplies 1.5 watts at the frequency of 56 megacycles per second. System D may comprise (FIG. 1) a quartz pilot oscillator 78, an amplifier stage 79 and an output stage 80 working as a class B push-pull oscillator, piloted by oscillator 78. The different units of system D are made of transistors protected by a transistor circuit breaking system restoring to zero in one microsecond the feed voltage of system D in case of over loading, this circuit breaker avoiding destruction of the transistors, which are very expensive.

Measurement head B works as follows:

System D feeds current to coil 75 so that said coil irradiates the solution contained in vessel 2 with electromagnetic energy at 56 megacycles per second and therefore saturates an electronic resonance line of the nitrosodisulfonate. By coupling between the electronic spins of the dissolved nitrosodisulfonate and the nuclear spins of the solvent (protons), these nuclear spins are dynamically polarized. During a first phase of every cycle, corresponding to the duration 67 of step 66 (curve c, FIG. 4), transistor 65 is conductive, whereas relay 5 is energized. Due to this energizing, plate 6 moves onto fixed contact 10. During this phase, coil 1 is, on the one hand, fed from stabilized source 14 through transistor 65 and, on the other hand, connected to the adjustable damping resistor 11. Due to its being fed from a constant voltage source and to the elimination of the oscillations by damping resistor 11, coil 1 receives a voltage step 78a (wave j of FIG. 4) and therefore a current pulse 79a passes therethrough (wave i of FIG. 4). It will be noted that the current pulse increases in a substantially linear fashion. This is due to the fact that the current is developed in circuit 12 in an exponential manner, with a time constant averaging 3.7 milliseconds, during 0.125 millisecond, so that the increase is practically linear. Coil 1 therefore produces in vessel 2 a unidirectional auxiliary field increasing in a substantially linear fashion for 0.125 millisecond, for instance from zero to 0.5 gauss. The whole of this auxiliary field and of the magnetic field to be measured (the earth field for instance) swings the magnetic moments of the sample contained in vessel 2 in a direction perpendicular to the direction of the magnetic field to be measured in which vessel 2 is located (as a matter of fact, quick passage conditions are complied with).

When the auxiliary field is cut off at the end of pulse 66 and when transistor 65 returns to its non-conductive state, there exists a very short disturbance period (cut off voltage peak 80a and current oscillation 81). Due to the fact that damping resistor 11 is still connected to coil 1, oscillations are not produced in this circuit. After the end of the disturbance which follows step 55, plate 6 returns against contact 7 (in FIG. 4 we have shown at g the positions of plate 6, the upper line portions 82 corresponding to plate 6 is on contact 7 and the lower line portions 83 to plate 6 is on contact 10). At this time, coil 1 is connected wtih variable capacitor 8 which is constituted (left hand lower corner of FIG. 3) by a box of capacitors in parallel which permit of introducing into oscillating circuit 9 different capacitors by means of a coarse adjustment switch 84, which brings into circuit capacitor 85 having a capacity equal to 3300 pf., the pair of capacitors 86 and 87, each of 1500 pf. (the series equivalent of which is a single capacitor of 750 pf.) and/or capacitor 88 of 1500 pf. and of a fine adjustment switch 89, capable of introducing, into the circuit, capacitor 90 of 47 pf., capacitor 91 of 100 pf., capacitor 92 of 220 pf. and/or capacitor 93 of 430 pf.

When the auxiliary magnetic field is cut off (when coil 1 ceases to be fed through transistor 65), the nuclear magnetic moments have a free precession movement about the magnetic field to be measured with a frequency equal to the Larmor frequency of said magnetic moments in said field (this frequency averages 2000 cycles per second for protons placed in the earth magnetic field), switches 84 and 89 having in fact for their effect to adjust the frequency of oscillating circuit 9 to the Larmor frequency, which permits of obtaining the maximum precession signal, this signal being supplied through conductor 94 to the amplifier system E.

This system E comprises (FIG. 1):

A low level preamplifier 95, working for instance with a feed voltage of 1.35 volts (supplied by an electric battery) and receiving on its input stage, in "common base" connection, the oscillations at the Larmor frequency generated in oscillating circuit 9, A selective amplifier 96 including tuned circuit 18 which determines the pass-band of this amplifier, this tuned circuit being disposed as the collector load of a transistor; the inductance element 20 of tuned or resonating circuit 18 consists of a ferrite pot, a compensation of the temperature drift of inductive element 20 being provided by means of a continuous polarization of the ferrite by a unit 21; the mounting which stabilizes the tuning frequency also permits a fine adjustment of this frequency by a potentiometer; and A voltage amplifier 97 which supplies a 20 volt voltage from peak to peak at the beginning of the precession signal, this signal being damped as seen at $k$ in FIG. 4.

The operation of system E is as follows:

During the first phase of every measurement cycle, that is to say when the auxiliary magnetic field is being established, plate 6 is on contact 10 and consequently system E is not fed with current. When, at the end of this first phase, plate 6 is applied against contact 7 (portion 82 of $g$ in FIG. 4), the amplifier system E is fed with the oscillations 99 at Larmor frequency generated in circuit 9 by the precession of the nuclear magnetic moments around the direction of the magnetic field to be measured. However, the closing of relay 15 being delayed with respect to the arrival of plate 6 against contact 7, the tuned circuit 18 of selective amplifier 96 is open and the gain thereof is very small. Thus the gain of system E is reduced during the switching period and consequently does not substantially amplify the parasitic pulses due to switching. When relay 15 is again closed, at time 98 (curve $h$ of FIG. 4), amplifier E again has its normal gain, due to the closing of tuned circuit 18, and it supplies sinusoidal oscillations 99 at the nuclear Larmor frequency (2000 cycles per second in the case of the precession of protons in the earth magnetic field). These oscillations are slowly decreasing or damped (curve $k$ of FIG. 4).

These damped oscillations leave, at 100, the amplifier system E and reach the frequency-meter or period-meter F intended to measure the frequency or the period of oscillations 99. For this purpose, the frequency-meter also receives from monostable multivibrator 3, on the one hand, at 101, the positive voltage steps 55 and, on the other hand, at 102, the negative pulses 56.

Frequency-meter or period-meter F essentially comprises a unit G generating negative voltage signals of a duration equal to that of a given, but preferably adjustable, number of Larmor periods, that is to say of periods of oscillations 99 arriving, at 100, into frequency-meter F, an oscillator H producing oscillations of stable, possibly adjustable, period, and a counting scale C counting the oscillations that have been generated by oscillator H during the time of a signal produced in unit G. Thus, in order to determine the frequency of oscillations 99 we have only to measure one period by determining the duration (in number of oscillations produced by H) of a given number of periods of the oscillations 99 the frequency of which is to be measured.

To be more accurate, according to a second feature of the invention, we therefore provide, in order to measure the duration of the Larmor period of oscillations 99, in combination:

A shaping unit 121 connected to the output 100 of amplifier system E to deduct, from the oscillations 99 at the Larmor frequency generated in oscillating circuit 9 by the voltage collected by coil 1 and amplified in said amplifier system E, rectangular signals of the same period;

A frequency divider 122 capable of dividing the frequency of said rectangular signals by a given integer, preferably adjustable by means of a switch 103 in such manner as to provide of several ranges of precision (the precision and duration of the measurement cycle increasing with the value of said integral number);

A gate system 104, disposed between shaping unit 121 and divider 122 in such manner as to permit the feed of divider 122 by shaping unit 121 only when said gate system 104 is fed with current;

A first bistable circuit 105 (bistable multivibrator), capable of feeding current to said gate system after it has received, on its first input 106, a delayed release signal, through a delay unit 107—constituted by a monostable multivibrator triggered by the rear edge of the positive voltage step 55 (this rear edge being transformed into a negative pulse by the input capacitor of the monostable multivibrator which constitutes the delay unit) to supply a negative voltage step 108, visible on the curve $m$ FIG. 4, which is applied to input 106—with respect to the time when coil 1 is connected with the amplifier system E;

A second bistable circuit 109 (bistable multivibrator), the inputs 110 and 111 of which are triggered by the output of divider 122 and the output 112 of which, fed during the switching of this bistable circuit 109 produced by the second output pulse from divider 122 produced after the beginning of a cycle, triggers the second input 113 of the first bistable circuit 105, in such manner as to stop the feed of said gate system 104, through its output 114;

A very stable and well determined high frequency oscillator H, for instance of the frequency of 1 megacycle per second with a precision of $2.10^{-7}$;

A counting scale C capable of counting the oscillations of said high frequency oscillator H during voltage step 115 (curve of FIG. 4) transmitted by the second bistable circuit 109 through its output 112; and Zero resetting means, for resetting to zero, at the end of every measurement cycle, divider 122 (which is necessary because the divider is not, at the end of a counting of the Larmor periods, in the desired position for a new counting) and possibly bistable circuits 105 and 109 (merely by way of safety since these bistable circuits are normally in the proper position unless a parasitic pulse has caused them to work accidentally), these zero resetting means consisting of conductors 176, 177 and 178 (the two last mentioned ones being shown in dotted lines since they are not used in normal conditions because the resetting to zero of bistable circuits 105 and 109 is a safety resetting to zero) which respectively triggers divider 122, the first input 106 of bistable circuit 105 and the first input 110 of bistable circuit 109 (the safety zero resetting pulses for bistable circuits 105 and 109 being negative, whereas the normal pulses for triggering these bistable circuits are positive; these zero resetting pulses truly trigger inputs 106 and 110 behind the input diodes of the bistable circuits).

In FIG. 4, we have shown by curve $n$, at 116, the duration of opening of the gates of system 104 controlled by the end of step 108 and stopped by the uprise of the second counting pulse 117 transmitted by divider 122 and by curve $p$ the output voltage of divider 122 advantageously constituted by a series of decades, the first output voltage rise being shown at 118.

In a preferred embodiment:

Oscillator H delivers oscillations of a frequency equal to 1 megacycle per second and of a mean or average voltage of 2 volts, which permits of displaying the duration of signal 115 in microseconds;

The shaping circuit 121 is a circuit of conventional type transforming the pseudo sinusoidal (damped sinusoidal) $k$ issuing from amplifier E into rectangular signals at the Larmor frequency;

Switch 103 permits of choosing for divider 122 the desired range of sensitivity, for instance by causing divider 122 to divide the frequency of the rectangular signals by 300, 500, 1000, 2000 or 4000;

The gate system 104 is such that it permits the passage of rectangular signals from shaping unit 121 toward divider 122 only when it is fed with current from the output 114 of bistable circuit 105;

Divider 122 is a frequency divider of conventional type which transmits a pulse only after reception of a given number of rectangular signals (for instance, as above indicated, 300, 500, 1000, 2000 or 4000 rectangular signals). For this purpose, divider 122 consists of two bistable circuits for division by two and of three decades, each including four bistable circuits, connected in series, in such manner that it can divide by 4000, the inputs chosen by switch 103, being connected as follows:

| Position of 103 | Input bistable circuit of 122 that is chosen | Number of periods that are measured |
| --- | --- | --- |
| G1 | 1st bistable circuit for division by two. | 4,000 |
| G2 | 2nd bistable circuit for division by two. | 2,000 |
| G3 | 1st bistable circuit of the first decade. | 1,000 |
| G4 | 2nd bistable circuit of the first decade. | 500 |
| G5 | 3rd bistable circuit of the first decade. | 300 |
| G0 | Stop |  |

Consequently, divider 122 will transmit a first pulse at the beginning of every counting period and a second pulse, also called last pulse, after the chosen number of periods (from 300 to 4000);

The counting delay monostable multivibrator 107 has for its effect to eliminate the first alternations of signal $k$, which have not a correct shape (advantageously, monostable multivibrator 107 comprises a potentiometer which permits of adjusting the duration of the delay, for instance from 10 to 110 milliseconds);

Bistable circuits 105 and 109 are bistable multivibrators of conventional type, the first one serving to control gate system 104 and the second one to transmit the voltage step 115, of a duration equal to 300, 500, 1000, 2000 or 4000 Larmor periods; each of them comprises two inputs, the first one, 106, 110 respectively, serving to control the switching from the initial state or state of rest to the energized state (both of these states being stable states) in which it remains until there is transmitted, to the second input 113, 111, respectively, a pulse which causes return to the state of rest, this return being also possibly obtained by the application of a zero resetting pulse which, generally, is without effect, because the zero resetting pulse arriving through conductors 117 and 118 is a safety pulse, since bistable circuits 105 and 109 are already normally in the position of rest, unless parasitic pulses have been produced; while it is in the energized state, bistable circuit 105 releases the gate system 104, whereas monostable multivibrator 109 transmits voltage step 115, of a duration equal to the given number of Larmor periods chosen by switch 103;

Counting scale C counts the number of oscillations from oscillator H, of a period equal to 1 megacycle per second, transmitted during the duration of signal 115, that is to say during 300, 500, 1000, 2000 or 4000 Larmor periods; scale C is advantageously constituted by the counting system called "ECT 11" manufactured by the firm called "Constructions Radio-Electriques et Electroniques du Centre," this scale having been modified to reduce its lag in order to make it able to count oscillations of one megacycle per second and having its input circuits changed so as to comprise a circuit for shaping the oscillations at one megacycle per second.

The modifications brought to the ECT 11 scale in order that it can count, in good conditions, oscillations at 1 megacycle per second are as follows:

The plate comprising the input circuit, called E 10A, is replaced by a plate containing a Schmitt trigger circuit for shaping oscillations at one megacycle per second followed by a transistor connected as an emitter-follower;

The 0.85 microsecond delay line included in the plate, called E 10B, is disconnected, the input on the plate taking place just before the gate which controls the passage of the pulses coming from said Schmitt trigger circuit;

The capacitors for the attack of the two decades of the scale are changed so as to take into account the modifications of the signals triggering these decades.

Counting scale C therefore determines the duration in microseconds of a given number of Larmor periods. In the case where switch 103 is placed in the position for which signal 115 lasts for 1000 Larmor periods, scale C determines the Larmor period of nuclear precession in nanoseconds. The Larmor period being known, it is easy to determine the intensity of the magnetic field, which is inversely proportional to this duration, the coefficient of the reciprocal relation being known with a high accuracy.

Figure 2:
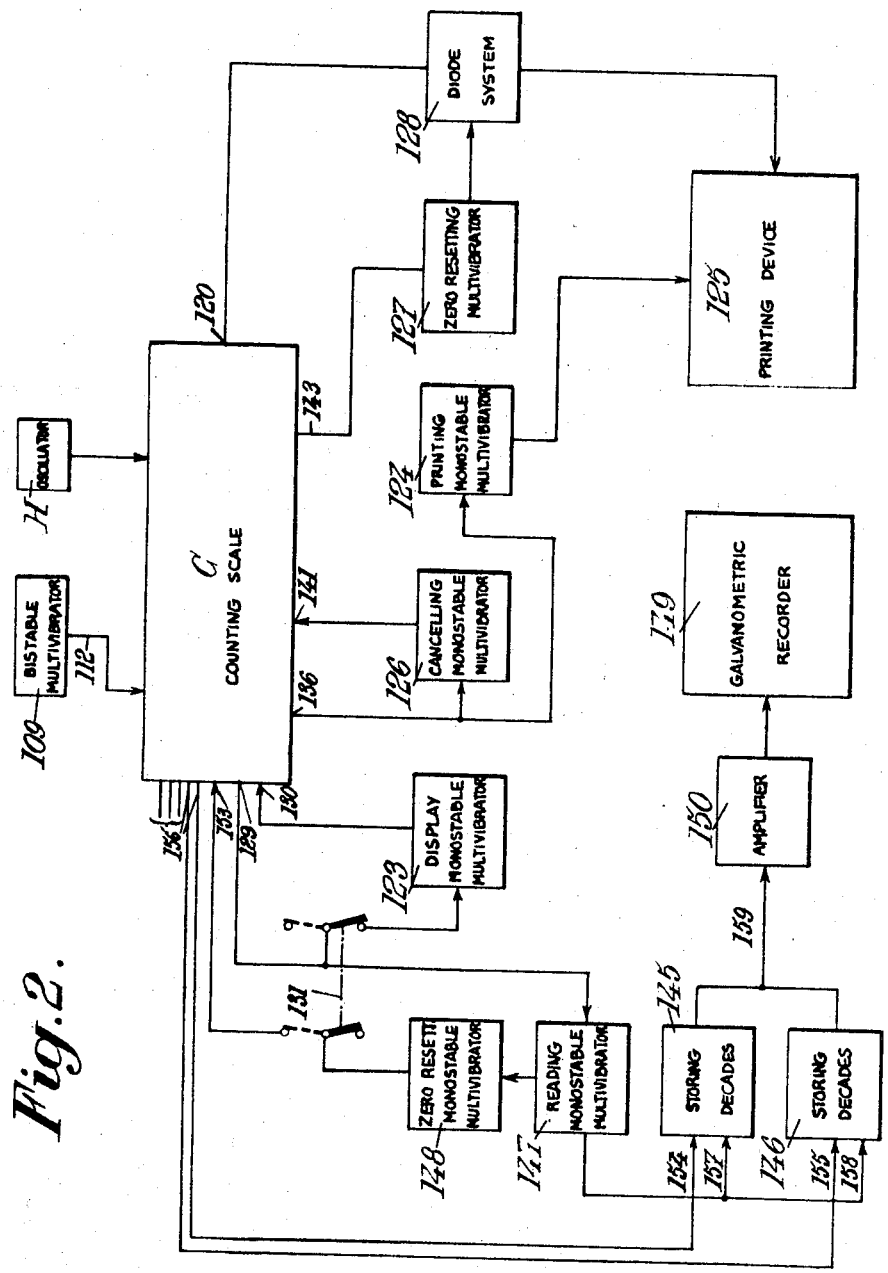
Figure 5:
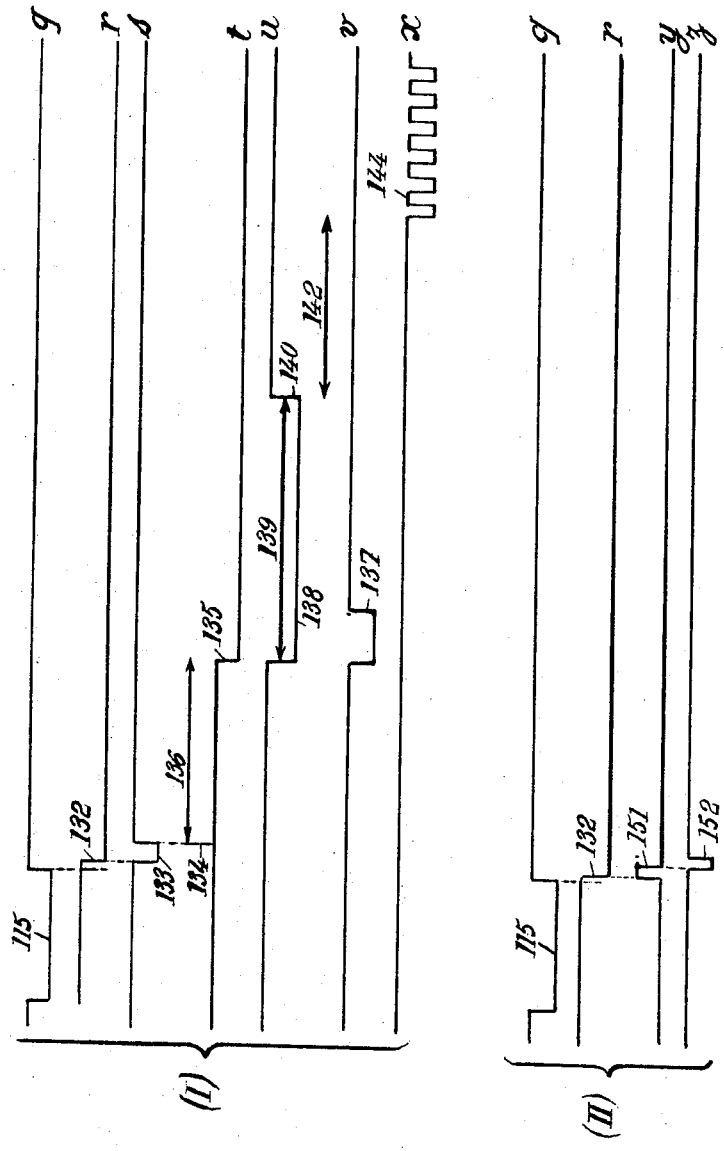

We will now describe, with respect to FIGS. 2 and 5, the displaying, printing and recording means for the values of the Larmor period of the nuclear precessions determined by scale C. Advantageously these means bring into play the third and fourth features of the invention.

Thus, according to the third feature of the invention, we provide a device for the numerical printing of the results of the measurements, this device comprising, in combination with counting scale C, a display monostable multivibrator 123 which causes the display by scale C of the number of high frequency oscillations (coming from oscillator H) counted in scale C at the end of said number (from 300 to 4000) of Larmor periods, a printing monostable multivibrator 124 which is triggered, at the end of the display controlled by the display end signal 135 of scale C, and which actuates, preferably through an amplifier (not shown), a numerical printing device 125 of a conventional type, a cancelling monostable multivibrator 126 which causes cancelling of the display in counter C some time (for instance about one second) after the end of the display, that is to say after printing has been performed by printing device 125, and means 127, 128 (constituted by a zero resetting multivibrator 127 and a system of diodes 128) for resetting to zero the printing device 125 in case of bad operation thereof.

More precisely, counting scale C comprises a display device, for instance of the decimal type, indicating the duration in microseconds of signal 115 (also represented by curve $q$ in FIG. 5 (I) which represents the wave shapes used for printing), this signal 115 being fed to counter C from the output 112 of bistable circuit 109.

The display monostable multivibrator 123 causes display to be performed in scale C after the end of the precounting signal 115. Its input is connected with the output 129 of scale C and its output is connected to the display input 130 of said scale C, a switch 131 making it possible to stop display. In FIG. 5 (I), we have illustrated by curve $r$ the time 129 corresponding to the delivery and stopping of scale C, which is slightly delayed with respect to the end of the precounting signal 115 and which actuates the display monostable multivibrator at time 132. The display monostable multivibrator 123 transmits a voltage step 133 (from time 132 to its return into stable state at the end of a predetermined duration), this step 133 being shown on the curve s of FIG. 5 (I). Said step 133 determines the beginning of display at 134, display ending at 135 and having a duration 136 (curve t of FIG. 5).

The display end signal issuing at 136 releases the printing monostable multivibrator 124 and the cancelling monostable multivibrator 126. The printing monostable multivibrator 124 transmits voltage step 137 (curve v of FIG. 5) which is amplified in the amplifier (not shown) supplying the power necessary for the operation of printing device 125. As for the cancelling monostable multivibrator 126, which has been triggered at the same time as monostable multivibrator 124, it transmits voltage step 138 the duration 139 of which corresponds to the time of reading of the display. At the end of step 138, at time 140, the cancelling monostable multivibrator 126 returns to its stable state and controls, through the cancelling input 141 of scale C, the cancelling of the display. The duration of the cancelling operation is represented in FIG. 5 (I) by interval 142, the end of the cancelling operation appearing on the "cancelling end" output 143 of scale C. The cancelling end signal acts upon multivibrator 127 which transmits rectangular pulses 144 (curve x of FIG. 5 (I)). This multivibrator 127 cooperates with diode circuit 128, which operates the connections between the windings of the mechanical decades of the display device (the output of which is shown at 120) of scale C, the windings of the decimal printing toothed wheels of printing device 12 and multivibrator 127.

In case of bad operation of this printing device, multivibrator 127 will return to zero, by the effect of its pulses 144, said printing device so that the latter is ready for further operation.

In addition to, or instead of, the printing means, a device of the type shown by FIGS. 1 and 3 may include recording means. Said means comprise, according to the fourth feature of the invention, an analog recording device for recording the measurement results, this device including, in combination with scale C, storing decades 145, 146, preferably constituted by bistable circuits including a tunnel diode and a transistor and adapted to supply an analog current proportional to the number that is stored, a reading monostable multivibrator 147 which is actuated at the end of said number of Larmor period (from 300 to 4000) and which controls the transfer to said storing decades 145–146 of the contents of corresponding decades of the counting scale, this monostable multivibrator 147 further controlling (in the case where the measurment results are not printed), through suitable means which advantageously comprise a monostable multivibrator 148, the resetting to zero of counting scale C, and a galvanometric recorder 149 fed, preferably through an amplifier 150, with the analog current delivered by said storing decades 145–146.

In particular, the reading monostable multivibrator 147 receives, same as the display monostable multivibrator 123 (in the case where the nuclear induction magnetometer comprises both recording means and printing means and if switch 131 is in the position shown in solid lines in FIG. 2), the stopping output signal (curve r of FIG. 5) coming from the stopping output 129 of scale C. The stopping signal, slightly delayed with respect to the end of precounting signal 115, accordingly produces the transmission by monostable multivibrator 147 of a voltage step 151 visible at y in FIG. 5 (II). This step 151 controls the storing into memory decades 145 and 146 of the values displayed in two consecutive decimal decades (chosen among the four last decades) of scale C without modifying the values displayed by said scale.

Furthermore, if there is no printing (there being no printing device provided or switch 131 being in the position shown in dotted lines in FIG. 2), step 151 also controls the release of the zero resetting monostable multivibrator 148, which transmits the voltage step 152 shown at z in FIG. 5 (II), which arrives to the zero resetting input 153 of scale C. The function of the zero resetting monostable multivibrator 148 is to reset to zero the decades of scale C in the case where there is no mechanical printing of the result. Besides, in this case, the duration of display is much shorter than when there is a printing which requires some time. For instance, when there is a printing, the period of repetition of the measurements averages five seconds, in order to permit printing, whereas, when there is only a recording, the measurements may be carried out at a repetition period of the order of 0.2 second when using the means for resetting the nuclear spins into phase as described in the above mentioned patent application.

As for the memory decades 145 and 146, they advantageously consist, as above indicated, of bistable circuits comprising each a tunnel diode and a transistor. These decades receive, at their inputs 154 and 155, the deliveries, available at 156, of two chosen decades of scale C and, at their inputs 157 and 158, the order of reading these decades of scale C, which order consists of step 151 delivered by the reading monostable multivibrator 147.

Figure 6:
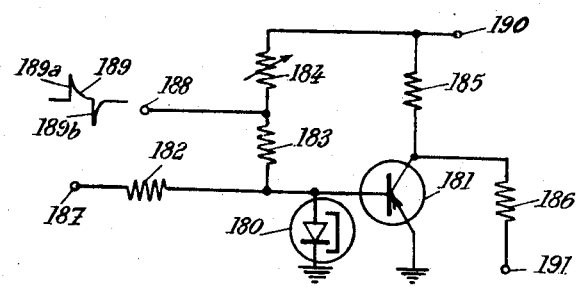
FIG. 6 shows the mounting of one of the four bistable circuits, including each a tunnel diode and the transistor, which constitutes each storing decade of the recording device.

Every memory decade consists of four memory bistable circuits each formed (as illustrated by FIG. 6, which represents one of these bistable circuits) by a tunnel diode 180 (at 1 milliampere) and by a PNP transistor 181 (for instance of the SFT 228 type), in combination with resistors 182, 183, 184, 185 and 186, the respective resistance values of which are 51; 4.7; 1.5 (maximum); 1.0 and R kilo-ohms. Input 187 is connected to the output of a bistable circuit of a decade of scale C. Input 188 receives signal 189 (which results from the differentiation of a pulse 151). The feed voltage (of 5.75 volts) is applied at 190. The output signal is available at 191.

Figure 7:
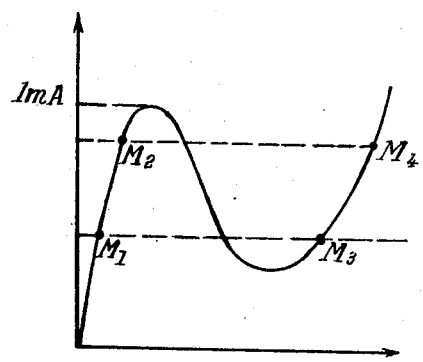
FIG. 7 shows the characteristic of the tunnel diode of the bistable circuit of FIG. 6.

The input characteristic of the memory bistable circuit is represented in FIG. 7 where the voltages are plotted in abscissas and the intensities in ordinates, the stable points of operation being $M_1$, $M_2$, $M_3$ and $M_4$.

It will be seen that the connection of the memory bistable circuit with the corresponding bistable circuit of scale C takes place through resistor 182 to the base of transistor 181.

If the corresponding bistable circuit of scale C is in the zero state, the voltage that is applied to the input resistor is, for instance, −8 volts, whereas, if said bistable circuit is in state "one," the voltage triggering input resistor 182 is 0 volt.

During counting, the point of operation of the memory bistable circuit passes either from $M_1$ to $M_2$ (or inversely) or from $M_3$ to $M_4$ (or inversely) according to the following table:

| State: | Points of operation |
|---|---|
| "Zero" | $M_2$ or $M_4$ |
| "One" | $M_1$ or $M_3$ |

The reading on the scale results from the fact that the important positive pulse 189a first returns the point of operation of the memory bistable circuit onto branch $M_1$, $M_2$. Then the negative calibrated pulse 189b causes the point of operation to pass to $M_4$ if it were at $M_2$; on the contrary if this point were at $M_1$, it remains at $M_1$.

In states $M_1$ and $M_2$, transistor 181 is nonconductive and the current available in the output resistor 186 is equal to $5.75/(R+1)$ milliamperes, in view of the fact that the voltage applied at 190 is equal to 5.75 volts and that the resistances of resistors 185 and 186 are equal to 1 and R kilo-ohms respectively. On the contrary, in states $M_3$ and $M_4$, transistor 181 is highly conductive and the voltage available in output resistor 186 is practically 0 volt.

Current will therefore be available at 191 when the state of the bistable circuit of the decade was "one," but no current will be available at 191 if this state were "zero."

The "weights" of the bistable circuits of the two successive decades being 1, 2, 4, 10, 20, 40, 80, the resistances R of the output resistors 186 of the successive bistable circuits have values which can be deduced from the following table, which gives the values of $R+1$ in kilo-ohms as a function of the weight of the bistable:

| | "Weight" of the bistable circuit | | | | | | | |
|---|---|---|---|---|---|---|---|---|
| | 1 | 2 | 4 | 8 | 10 | 20 | 40 | 80 |
| $R+1$ in kilo-ohms | 400 | 200 | 100 | 50 | 40 | 20 | 10 | 5 |

($R+1$ is inversely proportional to the weight of the bistable circuit).

The values above given correspond to a current per unit of $5.75/400=0.0144$ ma. and to a maximum current, for 99 units, of $0.0144 \times 99=1.422$ ma. This current is collected on a small impedance in order to produce a negligible voltage at the terminals thereof. We use for this purpose an operational amplifier 150 (FIG. 2) giving, at its output, 2 ma. under 6.5 volts for a maximum input voltage of 1.422 ma.

It will be seen that the storing decades or memory decades 145, 146 supply, at their output 159, an analog current proportional to the number taken in memory, that is to say to the number displayed by two consecutive decades of scale C. This current, of the order of 14 ma. per unit that is displayed, under a very low voltage, is amplified in operational amplifier 150, which supplies a voltage of 6.5 volts with an intensity of 2 ma. for the maximum number of 99 units.

The whole of the device illustrated by FIGS. 1 and 2 can be fed, either from the electricity distribution system, utilizing a box containing all the feeds, or from batteries and we have indicated, in FIG. 3, a feed source at −10 volts in unit 14 which includes a fuze 160, a feed source at +6 volts in unit 69 and a source 161 at −35 volts.

Furthermore the device may advantageously comprise a generator (not shown) of oscillations at a frequency close to that of the nuclear precession signal (for instance a generator of oscillations at 2000 cycles per second) which permits of testing nearly all the circuits in the case where it is desired to check up the operation of the device and correct precession of the atomic nuclei is not possible (due to surrounding metallic elements or due to parasitic magnetic fields induced by the electricity distributing system).

With the device which has been described, we easily obtain the indication of the duration of a Larmor period with a precision of the order of one nanosecond.

As substances producing the Overhauser-Abragam effect and which can be used in the device according to the present invention, we may cite, by way of nonlimitative examples, in addition to potassium nitrosodisulfonate, also called peroxylamine disulfonate, dissolved in water, pyridine or formamide:

Sodium nitrosodisulfonate in the same solvents,
Tetraphenylstibonium nitrosodisulfonate dissolved in diethyl ether,
Picryl-aminocarbazyl dissolved in benzene,
Semiquinones dissolved in water, as indicated in the United States Patent No. 3,049,661 filed Apr. 1, 1958, and delivered Aug. 14, 1962.

Or a free radical comprising a radical nitroxide group the nitrogen atom of which is on the other hand exclusively linked to two carbon atoms each linked to three other carbon atoms as indicated in the Luxembourg Patent No. 45,067 filed Dec. 20, 1963, and delivered Feb. 20, 1964, to which corresponds U.S. Patent No. 3,249,856 issued May 3, 1966, such as ditertiobutylnitroxide and its pentagonal or hexagonal cycle derivatives complying with the above formula and mentioned in said Luxembourg patent.

Among the advantages of the present invention may be mentioned the fact that it permits measurement of weak magnetic fields, and in particular of the earth magnetic field, with a high accuracy.

Furthermore, the device according to the present invention permits of displaying, recording and/or printing in decimal form the duration of a given, preferably adjustable, number of Larmor periods of the nuclear precession in the magnetic fields to be measured.

This device may be adapted to measurements at times very close to one another, for instance with a repetition period of 0.2 second when the results are not to be printed.

Furthermore, as the device makes use exclusively of transistors, the volume it occupies and its current consumption are very low. The measurements are wholly automatic.

In a general manner, while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What is claimed is:

1. A device for the measurement of weak magnetic fields by nuclear induction which comprises, in combination, a vessel, in said vessel a solution wherein the solvent contains a sample having atomic nuclei with an angular momentum and a magnetic moment both different from zero and the solute contains a paramagnetic substance displaying, when one of its electronic resonance lines is saturated, the Overhauser-Abragam effect, at least one first coil surrounding said sample to create therein, for every measurement operation, during a first period, an auxiliary magnetic field making an angle different from zero with the magnetic field to be measured, at least one second coil and a source of radio-frequency power for exciting said second coil for creating in said sample an electromagnetic field capable of saturating such an electronic resonance line, in order to ensure, during a second period, free precession of said atomic nuclei about the magnetic field to be measured with a Larmor frequency proportional to the intensity of said magnetic field to be measured, this precession creating an electromotive force at the same frequency in said first coil, two monostable multivibrators, a first one and a second one, for the switching and the feed of unidirectional current to said first coil surrounding said sample, an adjustable capacitor mounted in series with said first coil to form therewith a first oscillatory circuit at the Larmor frequency of the atomic nuclei in precession about the magnetic field to be measured, a period-meter, an amplifier system electrically connected between said first oscillatory circuit and said period-meter, a connecting cable leading to said first coil, a second oscillatory circuit constituted by the inductance of said first coil and the parasitic capacities of said first coil and of said cable, a damping resistor arranged to perform the critical damping of the oscillations that can be created in said second oscillatory circuit, a main relay having a position of rest and a working position, said main relay being adapted, in its position of rest, to connect said first coil via said connecting cable with said adjustable capacitor and hence with said period-meter, and, in its working position, to connect said first coil with said damping resistor, said first monostable multivibrator being adapted, when it is triggered at the beginning of every measurement cycle, to control the switching of said main relay from its rest position to its working position for damping oscillations occurring in said first coil, and a unidirectional current source, said second monostable multivibrator being mounted to be triggered after said first monostable multivibrator on every measurement cycle and being adapted, when triggered, to connect said first coil with said unidirectional current source for creating said oscillatory magnetic field, the times for which each of the two monostable multivibrators remains in its unstable state being adjusted in such manner that the second monostable multivibrator returns to its initial stable state before the first monostable multivibrator returns to its initial stable state, said second monostable multivibrator being adapted, when it returns to its initial state, to disconnect said unidirectional current source from said first coil, and said first monostable multivibrator being adapted, when it returns to its initial state, to control the switching of said main relay from its working position to its rest position thus connecting said first coil with said period meter for measuring the Larmor frequency of the free precession of said atomic nuclei about the magnetic field to be measured.

2. A device according to claim 1 wherein said second monostable multivibrator is adapted to return to its initial stable state after a time averaging the Larmor period or a fraction thereof.

3. A device according to claim 1 which further comprises an auxiliary relay adapted to be started in operation in response to the starting of the first monostable multivibrator into action and to return to its position of rest with a short delay with respect to the return of the main relay to the position of rest thereof, this auxiliary relay being arranged to open, when it is in the operative state, and an oscillatory circuit having its pass-band centered on the Larmor frequency, provided in said amplifier system, which reduces the gain thereof in the vicinity of said frequency.

4. A device according to claim 1 further comprising an astable multivibrator having an asymmetrical cycle, said astable multivibrator being arranged to trigger said first monostable multivibrator on every switching of said astable multivibrator from its first astable state to its second astable state and said second monostable multivibrator on every switching of said astable multivibrator from its second astable state to its first astable state.

5. A device for the measurement of weak magnetic fields by nuclear induction which comprises, in combination, a vessel containing a solution wherein the solvent contains a sample having atomic nuclei with an angular momentum and a magnetic moment both different from zero and the solute contains a paramagnetic substance displaying, when one of its electronic resonance lines is saturated, the Overhauser-Abragam effect, means for saturating said electronic resonance line to produce the Overhauser-Abragam effect, means for producing in said solution an auxiliary magnetic field making an angle different from zero with said magnetic field to be measured, and means for interrupting said auxiliary magnetic field to allow free precession of said atomic nuclei at the Larmor frequency about said magnetic field to be measured, a coil for picking up the electromotive force created by said precession, said coil being adapted to be connected in an oscillatory circuit tuned to said Larmor frequency, and means for connecting and disconnecting said coil in said oscillatory circuit, an amplifier system connected to said oscillatory circuit, a shaping unit connected to the output of said amplifier system and adapted to generate, from the Larmor frequency oscillations produced in said oscillatory circuit by the precession voltage collected by said coil and amplified in said amplifier system, rectangular signals of the same period, a divider capable of dividing the frequency of said rectangular signals by a given integral number, a gate system disposed between the shaping unit and the divider in such manner as to permit of feeding the divider from said shaping unit only when said gate system is fed with current, a first bistable circuit having two inputs, said first bistable circuit being capable of feeding said gate system with current after it has received, on its first input, a release signal from said means for connecting said coil in said oscillatory circuit, a delay unit for delaying said release signal with respect to the time of connection of said coil in said oscillatory circuit, a second bistable circuit having two inputs and an output, said last mentioned inputs being arranged to be acted upon by the output of said divider, and said last mentioned output, which is fed with current when said second bistable circuit is switched over by the second output pulse from said divider, produced after the beginning of a cycle, being adapted to produce a voltage step of duration corresponding to the Larmor frequency divided by said given integral number in said divider and said last mentioned output being further adapted to act upon the second input of said first bistable circuit in such manner as to stop the feed of current from said gate system through its output, and oscillator having a very stable and well determined high frequency, a counter connected to the output of said second bistable circuit and capable of counting the oscillations of said oscillator during the duration of the voltage step transmitted by said second bistable circuit through the output thereof, and zero resetting means for returning said divider to zero, at the end of every measurement cycle.

6. A device according to claim 5 wherein said divider is adjustable in order to have several ranges of precession and said zero resetting means are adapted to return said bistable circuits to zero.

7. A device according to claim 6 wherein said storing decades consists of bistable circuits including a tunnel diode and a transistor.

8. A device for the measurement of weak magnetic fields by nuclear induction which comprises, in combination, a vessel, in said vessel a solution where the solvent contains a sample having atomic nuclei with an angular momentum and a magnetic moment both different from zero, and the solute contains a paramagnetic substance displaying, when one of its electronic resonance lines is saturated, the Overhauser-Abragam effect, at least one first coil surrounding said sample to create therein, for every measurement operation, during a first period, an auxiliary magnetic field making an angle different from zero with the magnetic field to be measured, at least one second coil and a source of radio frequency power for exciting said second coil for creating in said sample an electromagnetic field capable of saturating such an electronic resonance line, in order to ensure, during a second period, free precession of said atomic nuclei about the magnetic field to be measured, with a Larmor frequency proportional to the intensity of said magnetic field to be measured, this precession creating an electromotive force at the same frequency in said low frequency coil, two monostable multivibrators, a first one and a second one, for the switching and the feed of unidirectional current to said low frequency coil surrounding said sample, an adjustable capacitor mounted in series with said first coil to form therewith a first oscillatory circuit at the Larmor frequency of the atomic nuclei in precession about the magnetic field to be measured, a period-meter, an amplifier system electrically connected between said first oscillatory circuit and said period-meter, a connecting cable leading to said first coil, a second oscillatory circuit constituted by the inductance of said first coil and the parasitic capacities of said first coil and of said cable, a damping resistor arranged to perform the critical damping of the oscillations that can be created in said second oscillatory circuit, a main relay having a position of rest and a working position, said main relay being adapted, in its position of rest, to connect said first coil via said connecting cable with said adjustable capacitor and hence with said period-meter, and, in its working position, to connect said first coil with said damping resistor, said first monostable multivibrator being adapted, when it is triggered at the beginning of every measurement cycle, to control the switching of said main relay from its rest position to its working position for damping oscillations occurring in said first coil, a unidirectional current source, said second monostable multivibrator being mounted to be triggered after said first monostable multivibrator on every measurement cycle and being adapted, when triggered, to connect said first coil with said unidirectional current source for creating said auxiliary magnetic field, the times for which each of the two monostable multivibrators remains in its unstable state being adjusted in such manner that the second monostable multivibrator returns to its initial stable state before the first monostable multivibrator returns to its initial stable state, said second monostable multivibrator being adapted, when it returns to its initial state, to disconnect said unidirectional current source from said first coil, and said first monostable multivibrator being adapted, when it returns to its initial state, to control the switching of said main relay from its working position to its rest position thus connecting said first coil with said period meter for measuring the Larmor frequency of the free precession of said atomic nuclei about the magnetic field to be measured; a device for measuring the duration of the Larmor period of nuclear precession including a shaping unit connected to the output of said amplifier system and adapted to generate, from the Larmor frequency oscillations produced in said oscillatory circuit by the precession voltage collected by said coil and amplified in said amplifier system, rectangular signals of the same period, a divider capable of dividing the frequency of said rectangular signals by a given integral number, a gate system disposed between the shaping unit and the divider in such manner as to permit feeding of the divider from said shaping unit only when said gate system is fed with current, a first bistable circuit having two inputs, said first bistable circuit being capable of feeding said gate system with current after it has received, on its first input, a release signal from said first monostable multivibrator, a delay unit for delaying said release signal with respect to the time of connection of said coil with the amplifying system, a second bistable circuit having two inputs and an output, said last mentioned inputs being arranged to be acted upon by the output of said divider, and said last mentioned output, which is fed with current when said second bistable circuit is switched over by the second output pulse from said divider produced after the beginning of a cycle, being adapted to produce a voltage step of duration corresponding to the Larmor frequency divided by said given integral number in said divider, and said last mentioned output being further adapted to act upon the second input of said first bistable circuit in such manner as to stop the feed of current from said gate system through its output, an oscillator having a very stable and well determined high frequency, a counter connected to the output of said second bistable circuit and capable of counting the oscillations of said oscillator during the duration of the voltage step transmitted by said second bistable circuit through the output thereof, and zero resetting means for returning said divider to zero, at the end of every measurement cycle, and a device for printing measurement results in numerical form, including said high frequency oscillator and said counter, a display monostable multivibrator having an input connected to said counter and an output connected to a display portion of said counter for displaying on said counter the number of high frequency oscillations counted at the end of said voltage step, a printing monostable multivibrator having an input connected to said counter and adapted to be triggered at the end of the display produced by said display monostable multivibrator, a numerical printing device having an input connected to an output of said printing monostable multivibrator and adapted to be operated by said printing monostable multivibrator, a cancelling monostable multivibrator having an input connected to said counter and adapted to be triggered at the end of the display produced by said display monostable multivibrator, said cancelling monostable multivibrator having an output connected to said counter for cancelling the indications on said counter a given time after the end of the display thereof, and means for resetting to zero the printing device in case of bad operation thereof.

9. A device for the measurement of weak magnetic fields by nuclear induction which comprises, in combination, a vessel, in said vessel a solution where the solvent contains a sample having atomic nuclei with an angular momentum and a magnetic moment both different from zero, and the solute contains a paramagnetic substance displaying, when one of its electronic resonance lines is saturated, the Overhauser-Abragam effect, at least one first coil surrounding said sample to create therein, for every measurement operation, during a first period, an auxiliary magnetic field making an angle different from zero with the magnetic field to be measured, at least one second coil and a source of radio-frequency power for exciting said second coil for creating in said sample an electromagnetic field capable of saturating such an electronic resonance line, in order to ensure, during a second period, free precession of said atomic nuclei about the magnetic field to be measured with a Larmor frequency proportion to the intensity of said magnetic field to be measured, this precession creating an electromotive force at the same frequency in said low frequency coil, two monostable multivibrators, a first one and a second one, for the switching and the feed of unidirectional current to said low frequency coil surrounding said sample, an adjustable capacitor mounted in series with said first coil to form therewith a first oscillatory circuit at the Larmor frequency of the atomic nuclei in precession about the magnetic field to be measured, a period-meter, an amplifier system electrically connected between said first oscillatory circuit and said period-meter, a connecting cable leading to said first coil, a second oscillatory circuit constituted by the inductance of said first coil and the parasitic capacities of said first coil and of said cable, a damping resistor arranged to perform the critical damping of the oscillations that can be created in said second oscillatory circuit, a main relay having a position of rest and a working position, said main relay being adapted, in its position of rest, to connect said first coil via said connecting cable with said adjustable capacitor and hence with said period-meter, and, in its working position, to connect said first coil with said damping resistor, said first monostable multivibrator being adapted, when it is triggered at the beginning of every measurement cycle, to control the switching of said main relay from its rest position to its working position for damping oscillations occurring in said first coil, a unidirectional current source, said second monostable multivibrator being mounted to be triggered after said first monostable multivibrator on every measurement cycle and being adapted, when triggered, to connect said first coil with said unidirectional current source for creating said auxiliary magnetic field, the times for which each of the two monostable multivibrators remains in its unstable state being adjusted in such manner that the second monostable multivibrator returns to its initial stable state before the first monostable multivibrator returns to its initial stable state, said second monostable multivibrator being adapted, when it returns to its initial state, to disconnect said unidirectional current source from said first coil, and said first monostable multivibrator being adapted, when it returns to its initial state, to control the switching of said main relay from its working position to its rest position thus connecting said first coil with said period-meter for measuring the Larmor frequency of the free precession of said atomic nuclei about the magnetic field to be measured, a device for measuring the duration of the Larmor period of nuclear precession including a shaping unit connected to the output of said amplifier system and adapted to generate, from the Larmor frequency oscillations produced in said oscillatory circuit by the precession voltage collected by said coil and amplified in said amplifier system, rectangular signals of the same period, a divider capable of dividing the frequency of said rectangular signals by a given integral number, a gate system disposed between the shaping unit and the divider in such manner as to permit of feeding the divider from said shaping unit only when said gate system is fed with current, a first bistable circuit having two inputs, said first bistable circuit being capable of feeding said gate system with current after it has received, on its first input, a release signal from said first monostable multivibrator, a delay unit for delaying said release signal with respect to the time of connection of said coil with the amplifying system, a second bistable circuit having two inputs and an output, said last mentioned inputs being arranged to be acted upon by the output of said divider, and said last mentioned output, which is fed with current when said second bistable circuit is switched over by the second output pulse from said divider produced after the beginning of a cycle, being adapted to produce a voltage step of duration corresponding to the Larmor frequency divided by said given integral number in said divider, and said last mentioned output being further adapted to act upon the second input of said first bistable circuit in such manner as to stop the feed of current from said gate system through its output, an oscillator having a very stable and well determined high frequency, a counter connected to the output of said second bistable circuit and capable of counting the oscillations of said oscillator during the duration of the voltage step transmitted by said second bistable circuit through the output thereof, and zero resetting means for returning said divider to zero, at the end of every measurement cycle, and a device for the analog recording of the measurement results, including said high frequency oscillator, and said counter, storing decades capable of supplying an analog current proportional to the number stored therein, a reading monostable multivibrator having an input connected to said counter and an output connected to said storing decades, said reading monostable multivibrator being operated at the end of said voltage step and being adapted to control the transfer to said storing decades of the content of the corresponding decades of said counter and a galvanometric recorder fed with the analog current delivered from said storing decades.

References Cited

UNITED STATES PATENTS

| 2,856,579 | 10/1958 | Packard | 324—0.5 |
| 3,103,622 | 9/1963 | Millership | 324—0.5 |
| 3,129,322 | 4/1964 | Sarratt | 235—92 |
| 3,133,243 | 5/1964 | Bonnet | 324—0.5 |
| 3,237,092 | 2/1966 | Allen | 324—0.5 |
| 3,275,931 | 9/1966 | Collins | 324—0.5 |

FOREIGN PATENTS 818,884   8/1959   Great Britain.

OTHER REFERENCES

Heppner et al., Journal of Geophysical Research, vol. 63, No. 2, June 1958, pp. 277, 278, 282, 283.

RUDOLPH V. ROLINEC, *Primary Examiner.*

MAYNARD R. WILBUR, WALTER L. CARLSON, *Examiners.*

M. J. LYNCH, *Assistant Examiner.*